Aug. 19, 1958 C. K. HOWEY ET AL 2,848,698

VARIABLE RELUCTANCE ELECTROMAGNETIC DEVICES

Filed April 1, 1957 3 Sheets-Sheet 1

Charles K. Howey,
Tom T. Kumagai,
Gordon A. Shifrin,
*INVENTORS.*

VARIABLE RELUCTANCE ELECTROMAGNETIC DEVICES
Fig. 6.
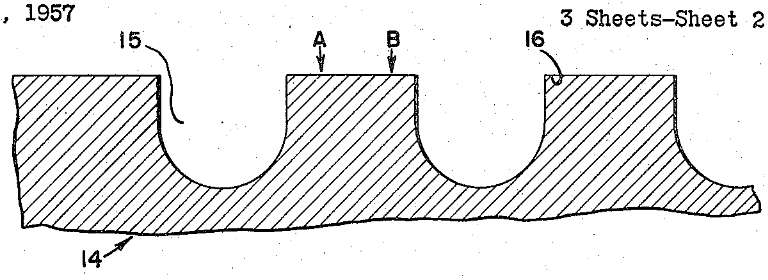
Fig. 7.
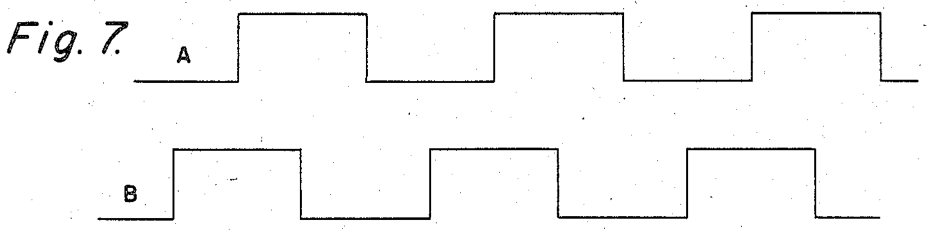
Fig. 3.
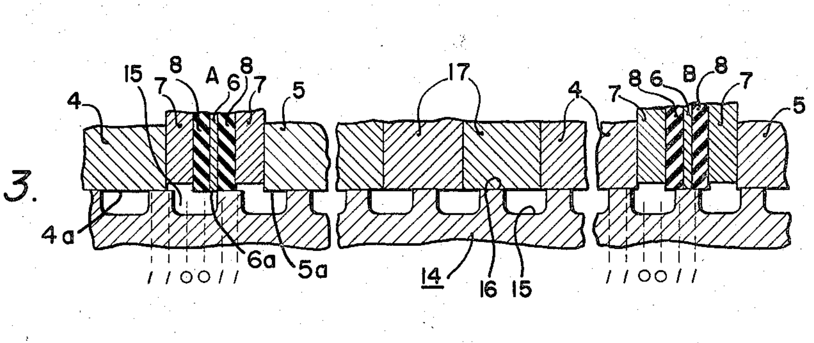
Fig. 5.
| | | | | | | | |
|---|---|---|---|---|---|---|---|
| A | o | o | / | / | o | o | / |
| B | o | / | / | o | o | / | / |
| | | | | | | | | | |
|---|---|---|---|---|---|---|---|---|---|
| A | o | o | o | / | / | / | o | o | o |
| B | o | o | / | / | / | o | o | o | / |
| C | o | / | / | / | o | o | o | / | / |
Fig. 8.
Fig. 12.
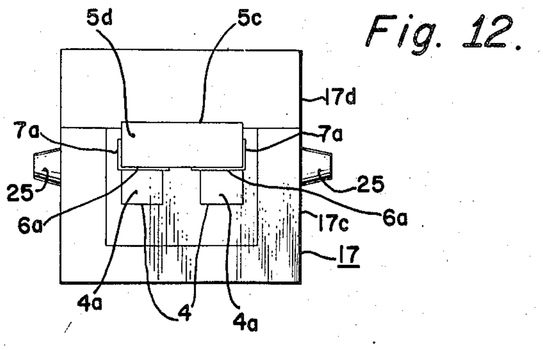
Charles K. Howey,
Tom T. Kumagai,
Gordon A. Shifrin,
*INVENTORS.*

VARIABLE RELUCTANCE ELECTROMAGNETIC DEVICES

Filed April 1, 1957 3 Sheets-Sheet 3

Charles K. Howey,
Tom T. Kumagai,
Gordon A. Shifrin,
INVENTORS.

2,848,698

VARIABLE RELUCTANCE ELECTROMAGNETIC DEVICES

Charles K. Howey, Torrance, Tom T. Kumagai, Los Angeles, and Gordon A. Shifrin, Torrance, Calif., assignors to Hughes Aircraft Company, Culver City, Calif., a corporation of Delaware Application April 1, 1957, Serial No. 650,045

12 Claims. (Cl. 336—30)

This invention relates generally to variable reluctance electromagnetic devices and more particularly to devices of this general type adaptable for detecting incremental physical displacements.

In certain of its aspects this invention relates to a copending application of D. F. Brower, Serial No. 533,602, filed September 12, 1955, and entitled "Twin Gap Recording Head."

In certain of its other aspects this invention relates to a second copending application of D. F. Brower, Serial No. 588,711, filed June 1, 1956, and entitled "Variable Reluctance Electromagnetic Device."

Both of the above copending applications are assigned to the assignee of this invention.

In the application of digital techniques to the detection, measurement and/or control of various physical quantities representable as physical displacements, an incremental displacement detector such as described in the second mentioned copending application of D. F. Brower is desirable. Such a device, or its functional equivalent, is capable of producing electrical output signals of binary character representing predetermined displacement increments. Briefly stated, such a device may comprise a grooved scale of magnetic material, wherein the distance between corresponding adjacent scale points on the grooves or lands represent a scale increment or division and an electromagnetic head of suitable size and configuration, having a pole face providing magnetic resolution of the grooves and lands, is disposed for movement relative to the grooves and lands in flux linkage with the scale. With such an arrangement the head changes between two repetitive impedance states in respective positions over a groove or a land. The plot of the impedance variations against displacement, assuming substantially equal scale divisions, approaches a square wave, which is characteristic of the electrical output signal of the head when suitably energized.

Conventional binary counting means responsive to a square wave voltage may be employed to count the voltage excursions to indicate displacement between the head and the scale with respect to a predetermined reference point, say the beginning of the grooves at one end of the scale. Thus, a physical quantity represented by the aforesaid physical displacement may be digitally indicated.

An arrangement of the character described provides a reliable displacement indication when the relative displacement occurs in a predetermined direction. If the relative displacement may occur in either direction from a reference point, the direction is not readily determined. Similarly, a reversal in the direction of motion resulting in a diminishing displacement with respect to the reference point, is not easily detected, resulting only in a further indication of scale counts.

An object of this invention is to provide an electromagnetic type of incremental displacement detector having directional sensitivity.

Another object of this invention is to provide an electromagnetic type of incremental displacement detector utilizing a grooved scale of magnetic material, in which the electrical indications denote physical increments of a smaller order than the scale divisions.

Further separate and combined objects of this invention are to provide a device of the character referred to which is rugged, easily manufactured, easily adjusted, and is relatively insensitive to vibration and shock.

In practicing this invention, increments of physical displacement are physically defined between corresponding adjacent points on a grooved scale of magnetic material. In one application the scale increments are substantially equal. At least two electromagnetic detector heads are employed, each comprising a core having a coil thereon. Each core has a pole face providing magnetic resolution with respect to the grooves and lands of the scale and is positioned with the respective pole faces confronting the grooved face of the scale and in flux linkage therewith. Provision is made for effecting relative displacement between the heads and the scale wherein the heads effectively traverse a path over the scale defined by the grooved portion of the scale. The heads are physically displaced with respect to each other along the scale path so that the electrical outputs of the heads are phase shifted in an appropriate amount, that electrical increments indicating physical displacement of a smaller order than the scale increments or divisions are obtained. Additionally directional information is obtained by noting the electrical states of the two heads in a first time increment and, in a second or succeeding time increment, noting which of the two heads has changed in electrical state. The electrical state of the heads may be determined for any position, for example, simultaneously over a groove or over a land, or with one over a groove and the other over a land or vice versa. For each of these conditions, the electrical state, with an electrical increment of displacement in one direction and then the other, may be determined. These conditions are repetitive and as such form a pattern from which the direction of motion with respect to a preceding position is always indicated.

While in this generalized description, reference has been made to the use of two detector heads in displaced positions with respect to each other along the scale, it is to be understood that this invention may be practiced with more than two heads, if desired.

The above-mentioned and other features and objects of this invention and the manner of attaining them will become more apparent by reference to the following description taken in conjunction with the accompanying drawings wherein:

Fig. 3 is an enlarged sectional view showing a tandem mounting of a pair of the electromagnetic detector heads positioned with respect to an engraved scale, the basic geometry being such as to afford directivity;

Fig. 5 illustrates, in terms of binary notation, the electrical states of the heads for a detector head assembly using two heads;

Fig. 6 is an enlarged cross sectional view of a fragmentary portion of a magnetic scale indicating the positions of a pair of heads disposed within a single scale division;

Fig. 7 illustrates the phase relation of the voltages of the respective detector head coils, according to the arrangements shown in Fig. 3 or in Figs. 10, 11, 12 or 13, which follow;

Fig. 8 illustrates, in terms of binary notation, the electrical states for a detector head assembly using three heads;

Figure 9:
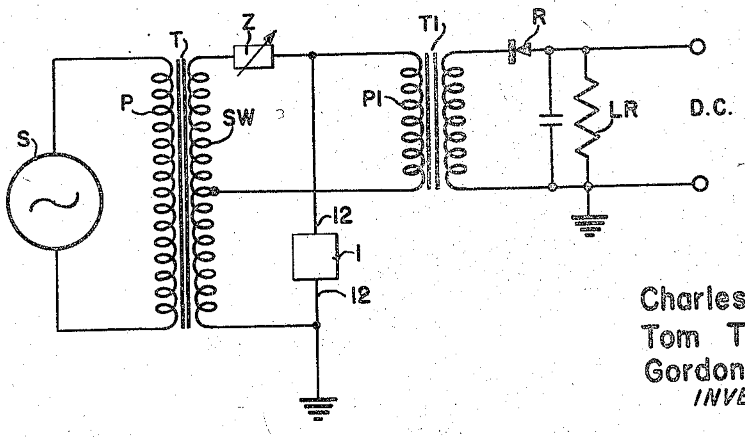
Figure 13:
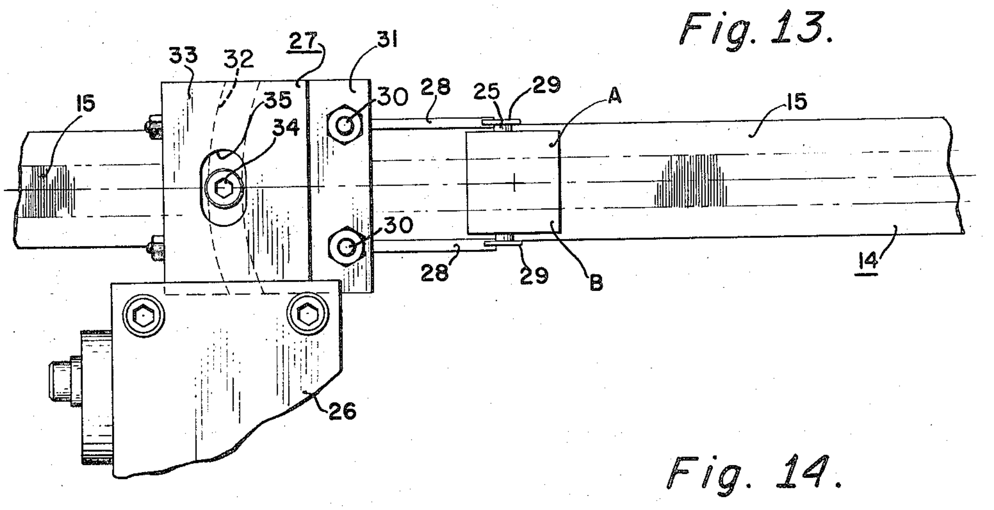
Figure 14:
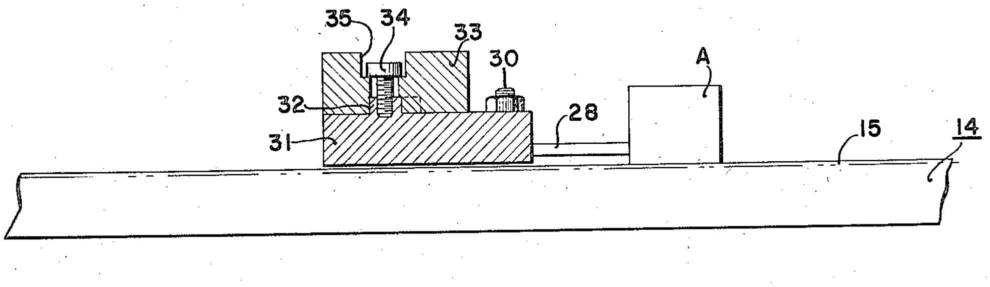
Figure 10:
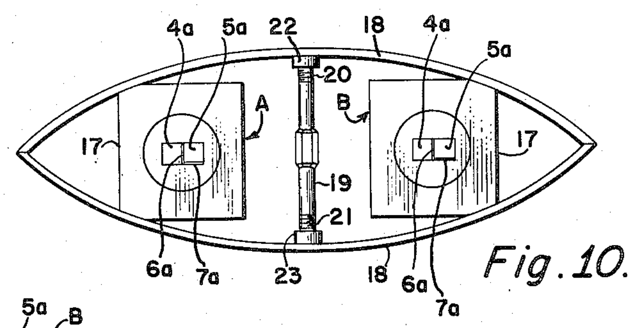
Figure 11:
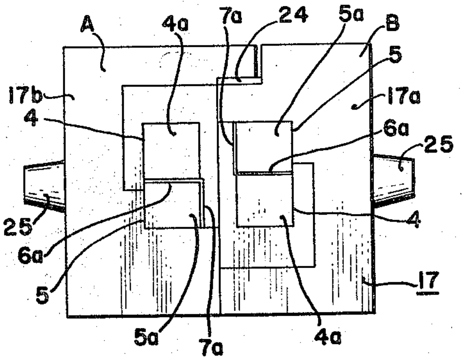

Fig. 9 diagrammatically illustrates a type of electrical circuit usable with the detector head herein described;

Figs. 10, 11 and 12 show different physical arrangements of a pair of detector heads; and Figs. 13 and 14 are respectively plan and longitudinal sectional views of a detector head assembly according to this invention, showing certain adjustment features.

Figure 1:
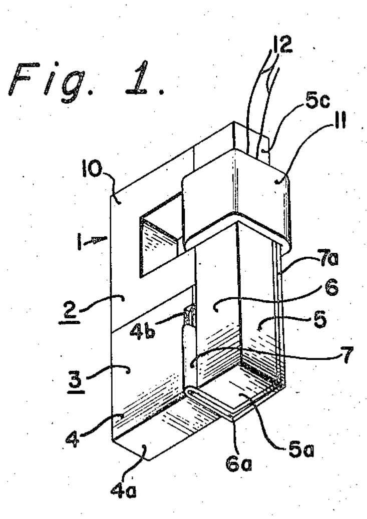
Fig. 1 is an isometric view of an electromagnetic detector head of the type employed herein.
Figure 2:
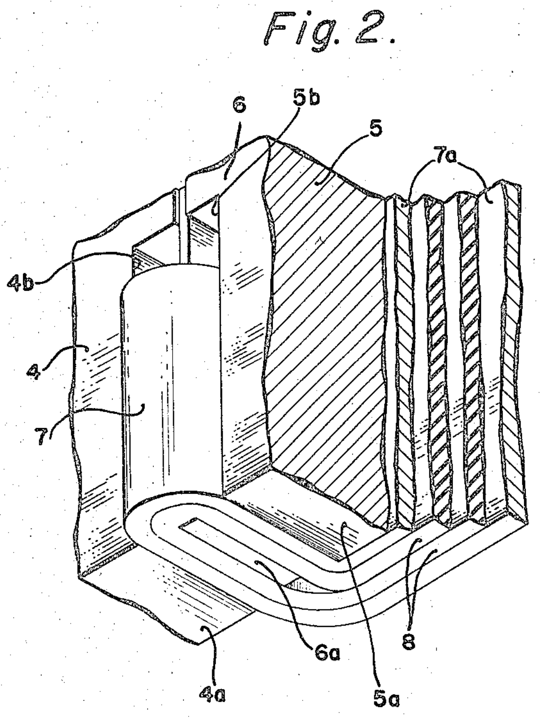
Fig. 2 is an enlarged fragmentary isometric view of the electromagnetic detector head showing the pole faces and the detector coil assembly.

A single detector head of the type employed in the incremental position detectors of this invention is illustrated in Fig. 1, and Fig. 2 is an enlarged scale illustration showing certain details of the detector head of Fig. 1 and incorporating a minor modification. Both of these figures will be referred to in describing the head assembly. The detector head assembly which is generally designated 1, comprises two substantially independent magnetic circuits respectively designated 2 and 3. The magnetic circuit 3 is a three-legged core assembly comprising two large core sections 4 and 5 of an electrical insulating magnetic material such as ferrite, or other suitable magnetic material. Core sections 4 and 5 comprise the two outer legs of the three-legged core assembly the leg 4 having a recess *4b*. The center leg is comprised of a foil-thick highly permeable strip of magnetic material, such as "Permalloy," which may be formed in thin foil thicknesses of the order of a few ten-thousandths of an inch. A single turn detector coil 7 of thin silver foil or other suitable electrical conducting material is disposed about the center leg. The bottom faces of the core sections or legs 4 and 5 together with the bottom face of the center core leg 6 define pole faces *4a*, *5a* and *6a*, respectively, occupying positions in a geometric surface, in this case a plane surface. These pole faces may be suitably shaped by grinding. As more clearly shown in Fig. 3, the single turn detector coil or winding is set back from the pole faces to prevent its lower edges from contacting the scale which may short circuit part or all of the coil. As a practical matter, this may be accomplished by a conventional preferential etching process.

In each of Figs. 1 and 2, the upper end of the center core leg 6 is disposed between and in engagement with confronting faces of core sections 4 and 5 to minimize magnetic circuit losses. In Fig. 1, the center core leg at its upper end is slightly displaced to the right to be engaged between the confronting faces of core sections 4 and 5, the center leg coil and core assembly fitting snugly in the cavity formed by recess *4b*. Alternatively as shown in Fig. 2, core section 5 may also be provided with a suitable recess *5b* to receive the right side of the coil. The recesses *4b* and *5b* define a cavity which snugly receives the coil and core assembly.

Magnetic circuit 2 comprises a U-shaped magnetic core section 10 which is bridged by the upper extension *5c* of core leg 5. A winding 11 is wound about the extension of the core leg 5 in a position thereon between the legs of the U-shaped core section 10. Part of the loop of the single turn detector coil extends up the back of leg 5 as seen in Fig. 1 at *7a* terminating in a loop or turn (not shown) beneath winding 11 about the core leg extension *5c*, in which position it is inductively or transformer coupled with winding 11. Leads 12 are brought out of the transformer from winding 11 to provide electrical connections for the transformer assembly. In this application the transformer is combined in the detector head assembly to provide a transformed inductance of usable magnitude, since the single turn detector coil 7 has extremely low inductance. By building the transformer into the detector head, lead inductance and resistance which would tend to mask the relatively large percentage change in the inductance of the detector coil are avoided. As a typical example, the effective inductance of the assembly including the transformer 5 is about 100 microhenrys. As will be seen by reference to Fig. 1, the arrangement comprises two different magnetic circuits; magnetic circuit 1 being of the form of a closed loop provided by bridging a section *5c* of the core leg 5 with the U-shaped magnet 10 to provide a closed magnetic loop for the transformer. The second is the detector head portion which comprises the three-legged magnetic circuit including the foil-thick core leg 6 as the center leg.

The details of the detector coil and core assembly will be readily apparent from an inspection of Fig. 2. In this figure, a layer of electrical insulating material such as insulating paper 8 is disposed between the center core leg 6 and the sides of the single turn winding 7. The cavity in which the detector assembly is mounted is determined by the faces of recesses *4b* and *5b*. Insulation between the coil and the outer core legs may be provided where needed. If an electrical insulating type of magnetic material such as ferrite is used for the main poles, insulation between the outer core legs and the coil is not needed. The assembly illustrated in Fig. 1 may be suitably potted inside a metallic housing of a material of good electrical conductivity, for example, brass. Such a housing tends to act as a shield, minimizing stray pick-up and at the same time integrates the assembly. Further details on this point will be discussed hereinafter in regard to a particular application.

A complete assembly fragmentarily illustrating two detector heads A and B in end-to-end or tandem relationship along the scale appears in section in Fig. 3. Here discrete increment as of physical displacement are established by means of an engraved scale 14 having a scale path comprised of regularly spaced laterally disposed grooves 15 defining lands 16 therebetween. The grooves and lands divide the scale into substantially equal scale divisions. In one practical embodiment of this invention, the pole faces *4a*, *5a* and *6a* of the respective legs 4, 5 and 6 of the three-legged core assemblies A and B are disposed to slide along the flat surface lands of the engraved scale 14. Usually an oil film will be provided to minimize friction between the relatively moving surfaces. By other alternatives a small airgap may be maintained. From this figure, which in enlarged scale approximately indicates the relative dimensions of the grooves and lands and the pole faces for one mode of operation, it will be seen that the pole face *6a* defined at the bottom of the center leg 6 has a width substantially less than the width of the respective grooves 15 and that the pole faces *4a* and *5a* defined by respective outer core legs 4 and 5 have sufficient width to straddle a predetermined plurality of the grooves and lands, so that the primary change in magnetic reluctance of the detector magnetic circuit is due to the position of the center core leg 6 with respect to the grooves and lands of the engraved scale 14, substantially to the exclusion of sensitivity to variations in position of the pole faces *4a* and *5a* along the engraved scale. Thus a positive indication of the position of the electromagnetic detector with respect to a groove or a land is obtained.

Figure 4:
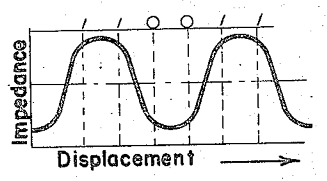
Fig. 4 is a graph illustrating the plot of impedance of the detector coil against displacement for a head and scale arrangement of the type described.

Referring further to Fig. 3 and particularly to the detector head assembly A on the left which is positioned over a groove 15, it will be seen that as the pole face *6a* of the center core leg 6 approaches a groove edge at which point it passes over a land, the dimension of the airgap between the pole face *6a* of the center core leg and the slot or groove edge diminishes. In view of this, the magnetic reluctance due to the diminishing airgap changes rapidly, which, in effect, results in a degree of anticipation of approach of the land. To obtain an impedance change when referred to displacement, which is approximately equal in width in its two extremes, it has been found desirable to make the width of the center core leg pole face 6a approximately equal to, or less than, the width of a land which, in turn, is less than the width of a groove. Some approximate dimensions of one practical embodiment having four mil scale divisions may indicate this point. In this arrangement the width of a groove was about 2.6 mils, the width of a land was approximately of the order of 1.4 mils, and the width of the center pole face, determined by the thickness of the center core leg, was of the order of 0.7 of a mil. Thus, by reference to Fig. 4, which shows a plot of the impedance change against displacement, it is possible to obtain signals resulting from the impedance change which near the two extremes are approximately equal in width with displacement. The curve illustrated in Fig. 4 closely approaches oscilloscope traces obtained with one practical embodiment of this invention. Of course, the dimension relationships referred to above may be varied as required. With the head described using a center pole face having a width of 0.7 mils, the curve of Fig. 4 may be made to approach a square wave by using a coarser scale. Alternatively reduction in the width of the center pole face leaving the scale unchanged tends to achieve this effect. Practical considerations preclude appreciable reductions of the center pole face without materially reducing performance.

It will be appreciated that the apparatus described to this point is capable of detecting discrete steps of displacement determined by the spacing between the centers of the grooves of the engraved scale. In view of the fact that the pole faces 4a and 5a are sufficiently wide to straddle a plurality of adjacent grooves, these pole faces are relatively insensitive to position along the scale. The center pole therefore functions effectively as a magnetic probe providing high magnetic resolution with respect to the grooves and the lands and further providing a fixed reference point on the head for indexing purposes, from which precise position determinations may be made.

Accurate position detection is determined primarily by the magnitude of the spacing between the grooves and by the accuracy of the spacing, that is, equal scale divisions. Present machine tool accuracies, or the accuracy provided by well-known etching processes, have been found adequate in providing the accuracy needed for a scale of this type. Thus while changes in electrical characteristics are a basic necessity in producing electrical signals indicative of increments of displacement, it will be appreciated that the equipment is not dependent upon exact values of these electrical variations but dependent substantially only upon the accuracy of the scale, which is a mechanical problem and which may be predetermined in the manufacturing process.

Direction sensing may be obtained by utilizing two heads arranged in tandem relation along the scale and having their center pole faces displaced so that the output voltages of the heads are displaced by 90°. As a practical matter this may be accomplished in two ways. In the tandem arrangement illustrated in Fig. 3, the head assemblies A and B are displaced some whole multiple of a scale division plus or minus substantially a quarter of a scale division. If the heads are arranged in side-by-side relation, they may be displaced along the scale substantially a quarter of a scale division. The distance between any two corresponding adjacent points on the scale corresponds to a full cycle of output voltage on the head. Thus, referred to the electrical output voltage, the displacement of the heads for either the tandem or side-by-side arrangements may be defined as $180°/N$, where N represents the number of heads. Thus for two heads, the electrical phase relation of the voltages is 90°, as described above.

Parts on the detector head B on the right in Fig. 3, corresponding to those on the head on the left, bear like reference characters. Physically, this arrangement involves employing two complete assemblies A and B, respectively, such as illustrated in Fig. 1 and positioning these two assemblies in end-to-end or tandem relation. This is illustrated fragmentarily in one form of embodiment in Fig. 3, which also shows fragmentary portions 17 of the non-magnetic metallic housings for the respective detector heads, referred to above. With the arrangement shown, the electromagnetic heads are potted in separate metal housings which are then disposed in abutting relationship and thereafter suitably clamped (not shown). Shims (not shown) may be provided between the abutting faces of the housings as required to achieve accurate displacement.

For the purpose of this description, the grooved scale has been divided into one-quarter increments in the regions adjacent the detector heads and marked with 1's and 0's in positions corresponding respectively to high and low coil impedance values, corresponding to one convention of binary notation. In this instance, the 1's correspond to the high voltage states of the detector head coils and the 0's correspond to the low voltage states. Assuming motion of the detector head assembly is toward the left, as seen in Fig. 3, it will be appreciated that as the center core leg 6 of the assembly A on the left moves across groove 15 toward the land on the left thereof, that the reluctance of the magnetic circuit associated with this detector head will remain high through the two zero positions indicated. On the other hand, referring to the detector head assembly B on the right, as the core leg 6 thereof moves across the land over which it is illustrated and over the groove adjacent thereto on the left, the reluctance of the magnetic circuit associated therewith will remain low through position 1 and then increase with movement through the adjacent zero position. For the binary code convention that has been herein adopted, on moving from left to right, the left head A passes successive points 1 1 0 0 1 1 0 0 etc., while the right head B passes successive points 1 0 0 1 1 0 0 1, during the same intervals of time. Thus, from any point along the scale, motion to the left or to the right results in electrical signals which in terms of the binary code give directional information. The 1's and 0's have also been indicated on the curve of Fig. 4 to associate the scale positions with the electrical states of the heads. This single curve of course is applicable to both of the heads individually.

A better understanding of this principle may be had by reference to Figs. 5, 6 and 7. Fig. 6 shows an enlarged fragmentary portion of the scale and the arrows A and B indicate the relative positions of the center pole faces of a pair of detector heads. Assuming in this instance simultaneous motion of the heads from right to left of the scale, the head A moves out over the groove 15 to the left prior to head B. Fig. 5 illustrates, again in binary notation, the relation of the electrical states of the two heads. In the positions shown, both heads A and B are in a one state condition. Movement toward the left results in an inductance change in head A in the second position illustrated in Fig. 5, moving from right to left, corresponding to the zero state. Head B is now positioned at the spot previously occupied by head A. Thus, from the position in which both heads existed in the one state, head A switches to a zero state position while head B remains in its one state electrical position. Further movement of the heads positions the heads simultaneously over the groove 15 at which time both heads are in their electrical zero states, etc. In Fig. 7, the idealized voltage states of the two heads are plotted as square waves shifted in phase by 90°.

By sampling the voltage state outputs periodically, any sampling can be logically compared against a previous sampling to detect one change in state when a change in state occurs. For example, with the heads positioned as indicated in Fig. 6, the voltage levels of both of the detector coils are high corresponding to the 1 state indicated. Movement from right to left results in a drop in voltage in head A. The voltage of head B remains high. Movement of the head assembly towards the right from the position indicated in Fig. 6 results in a drop in voltage of head B as head B moves over the groove on the right while the voltage level of head A remains high. Thus when the heads are simultaneously over a land in a first time interval, a drop in voltage of head A in a second time interval indicates movement toward the left whereas a drop in voltage in head B indicates movement toward the right. By the same reasoning any indicated point on the scale may be selected as a reference and the electrical states of the heads determined for movement to the left and to the right therefrom. In each instance, for each defined increment of movement, only one change in electrical state occurs, the head changing in electrical state indicating the direction in which movement has occurred. On this basis a truth table may be prepared with respect to each defined increment along the scale, indicating the change in electrical state and direction of movement in each direction from a selected point. The only requirement in this application is that the sampling rate must be such that no more than one change in electrical state can take place between the two electrical outputs between two consecutive samplings, otherwise direction becomes ambiguous.

With the arrangement described it will be appreciated that significant changes in electrical state between the two heads occur with movement between any two corresponding adjacent scale points in the amount of twice the number of individual electromagnetic detector heads. In other words, the electrical scale count is four times the mechanical scale count which effectively multiplies the mechanical scale divisions by four, increasing the fineness of reading, or resolution, by four. Thus on the four mil division scale described, the accuracy of reading is of the order of one mil.

While two heads have been described in connection with reading of the scale, it should be noted that the arrangement is not limited to the use of two heads but may include more than two heads. For example, if three heads are employed, the displacement in terms of the electrical outputs of the heads may be defined again as 180° $N$. For three heads, this amounts to successive head displacements in the amount of 60 electrical degrees which corresponds roughly to one-sixth of a scale division. In Fig. 8 the three heads are indicated A, B and C. Here again, logical reasoning of the character applied in connection with the use of two heads describes the operation of the device. The positioning of the heads is such that for each electrical increment of displacement only one head will change its electrical state. Thus direction from the logic as applied to the three heads may be predicted on the basis of a single change in electrical state, with reference of course to the preceding electrical states of the heads. By using three, four or more heads, it is possible to achieve the same accuracy with a coarser mechanical scale. Additionally the use of a coarser scale, while maintaining the head dimensions, as previously noted, results in a voltage wave output more nearly approaching a square wave for each head.

The circuit arrangement in Fig. 9 illustrates a typical alternating current energized bridge circuit supplied by an alternating current source S. Alternating current source S supplies primary winding P of a transformer T having a center tapped secondary winding SW. The tapped sections of the secondary winding form adjacent legs of the bridge circuit, the remaining legs of which comprise a balancing impedance Z and an electromagnetic detector head assembly 1, of the type herein described. The output of this alternating current bridge circuit is applied to primary winding P1 of a coupling transformer T1, the secondary winding of which is connected across a suitable load resistor LR, or impedance, having a rectifier R connected in series therewith. The frequency of the alternating current source S is preferably selected to be higher than the highest expected frequency of the impedance change of the head in a range providing optimum head performance and the head therefore modulates the supply voltage. The output of the bridge circuit appears as a direct-current voltage across the load resistor LR. The bridge may be balanced for either value of impedance of the detector head. By this means, the output of the bridge circuit may be varied between zero, or some predetermined low value of output voltage, and some predetermined higher value of output voltage. The use of two such bridge circuits and the comparison of their output voltages, when referred to a physical arrangement such as illustrated in Fig. 3, or the comparison of the bridge outputs after conventional clipping and squaring, in binary circuits, affords digital information concerning displacement magnitudes, with respect to a point of zero reference on the scale, and direction.

The various digital circuits embodying the necessary logic as described hereinabove, to indicate displacement magnitudes and direction may embody well-known digital techniques. A circuit arrangement embodying certain novel concepts, applicable in connection with two heads is described in a copending application of J. V. Blankenbaker, Serial No. 600,811, filed July 30, 1956, and entitled "Algebraic Scale Counter." A second application in the name of T. T. Kumagai, Serial No. 604,466, filed August 16, 1956, entitled "Direction Sensing and Displacement Detection Apparatus," now Patent 2,808,650, issued October 8, 1957, describes a more flexible digital circuit arrangement applicable with two or more heads. Both of these applications are assigned to the assignee of this invention and reference thereto may be had for specific details concerning certain presently preferred digital systems which may be employed with detector head assemblies as described herein.

The positioning of the heads in displaced positions relative to the scale must be precisely determined for optimum performance. A type of support which has been found satisfactory for a tandem type of mounting as described in connection with Fig. 3, is illustrated in Fig. 10. In this arrangement, two identical detector head assemblies A and B mounted in individual brass housings 17, are securely disposed between correspondingly spaced points of a pair of oppositely bowed spring members 18 which are joined at their extremities to form a substantially elliptical arrangement. An adjusting screw 19 having oppositely threaded ends 20 and 21, threads into internally threaded lugs 22 and 23 at oppositely disposed points substantially centrally of the bowed assembly and functions as a jack, to extend and retract the opposite sides of the bowed spring assembly. It will be appreciated that this provides a micrometer type of adjustment of the longitudinal dimension between the center pole faces **6*a*** of the tandem mounted heads, extending or diminishing the dimension between the center pole faces in very small amounts with rotation of the screw. By this expedient, it is possible to precisely straddle the required distance along the scale to produce the quadrature phase relation between the individual electrical outputs of the heads. An adjustment of this type can be conveniently made with the head in position on the scale while observing the outputs of the heads on an oscilloscope.

It will be appreciated that a mounting of this type presumes an accurate scale, that is, a scale in which the scale divisions are essentially exactly equal so that an accumulated scale count error may not occur in the fixed distance between the center pole faces. This could result in adding or losing scale counts. An arrangement which minimizes this problem and provides a compact structure is illustrated in the side-by-side arrangement referred to hereinabove, two embodiments of which are illustrated in Figs. 11 and 12. With such an arrangement the scale grooves are preferably sufficiently long to at least straddle the combined lengths of the two center pole faces *6a* plus any spacing therebetween so that the entire pole face of each head will be within the grooved area of the scale. In this arrangement, the pole faces are displaced in the direction of their widths by 90 electrical degrees which corresponds essentially to one-quarter of a scale division. Thus both center poles simultaneously examine a scale region which is less than a full mechanical scale division and the possibility of a cumulative error as noted above is obviated.

In Fig. 11, this is accomplished by making a split housing 17 and potting the respective electromagnetic heads in the respective sections 17*a* and 17*b* of the housing. When the mating faces of the housing are brought together the center pole faces are oriented in approximate end-to-end relation, as shown in Fig. 11, and their displacement to provide the desired degree of phase shift in the output voltages is achieved by means of a shim or shims 24 provided in a cavity formed between confronting face portions of the housing. Suitable bosses 25 are provided at opposite sides of the housing to provide a means whereby the head assembly may be mounted for movement with respect to the scale. This will be described at a later point.

Fig. 12 again illustrates a side-by-side mounting of the electromagnetic heads and differs in certain details from the arrangement illustrated in Fig. 11. In Fig. 12, one of the main core legs 5*c* is fabricated as a single piece having a dimension forming a single pole face 5*d* of sufficient length to space the center pole faces 6*a* in end-to-end relation. The remaining main pole pieces for each of the electromagnetic heads are individual pieces as before, forming individual pole faces 4*a*. The cross section of this assembly provides two three-legged cores as indicated in Figs. 1, 2 and 3 but the structure is integrated in the provision of a single main pole piece. With this arrangement, there is no intentional physical displacement, widthwise, of the center pole faces 6*a* and suitable phasing of the voltages of the respective detector coils is achieved by rotating the head over the face of the scale about an axis substantially perpendicular to the scale.

Figs. 13 and 14 illustrate a practical arrangement for accomplishing this. This arrangement may be visualized in connection with a machine tool slide, for example, a lathe, wherein the grooved scale 14 may be mounted on the bed (not shown) of the machine, for example, between the ways on the machine tool bed, and the detector head assembly mounted on a carriage 26 which rides the ways. A two piece support 27 which is suitably fastened to the carriage extends out over the scale 14 and is provided with a pair of laterally spaced resilient rods or bars 28 having a lateral spacing therebetween sufficient to receive the dual detector head assembly therebetween. These bars 28 extend from one end of the support in a direction substantially paralleling the scale 14 and terminate in small journals 29 which rotatably receive the bosses 25 on the opposite sides of the detector head housing 17. The bars 28 spring load the pole face side of the detector head assembly against the grooved scale 14 and an oil film (not shown) may be provided over the scale to minimize friction and wear. The spring loading may be varied to vary the pressure between the head and the scale by means of a pair of adjusting screws 30 which thread into the support 27 and bear against the individual bars 28. The screws 30 are effective to drive the bars toward the scale until the desired spring loading is obtained.

As will be seen from Fig. 14, the support comprises two parts, a lower adjustable part 31, having an arcuate guide 32, the center of curvature of which coincides with the center of the detector head and an upper portion 33 secured to the carriage 26, having an arcuate slot which receives the arcuate guide. The assembly is locked by means of a locking screw 34 which clears through a suitable slot 35 in the stationary top portion and threads into the guide 32. By means of this expedient, the head assembly may be rotated by laterally displacing the adjustable lower portion 31 of the support 27 along the arcuate slot. This provides a vernier type of adjustment for angularly rotating the detector head assembly about an axis perpendicular to the scale. This skews the center pole faces with respect to the scale grooves and lands in that slight amount which is needed to shift the centers of the pole faces to provide the required phase shift in the voltages of the respective detector heads. If desired, a vernier screw adjustment (not shown) controlling the relative displacement between the upper and lower parts of the support 27 may be provided to afford very precise control over the angular displacement of the head. However, in view of the coarse nature of the adjustment between the sliding support parts to achieve very small angular displacements at the head, such refinements are not necessary. Moreover, once this adjustment is properly made, it usually needs no further correction.

The arrangements herein disclosed represent presently preferred embodiments of this invention. In connection with this description, reference has been made to specific mechanical details and mechanical configurations. It will be appreciated by those skilled in the art that this invention may be practiced with arrangements differing in specific detail from those herein illustrated. For instance, the slots may be slanted on the scale to obviate the necessity for a shimmed head of the type shown in Fig. 11. In any case, however, head adjustment by rotation for accurate phasing may be necessary. Also separate staggered scales for separate heads may be used. The scales need not be straight but may be formed by radial lines in a circle on a plate. They may be on a cylinder or a drum. In some applications a fine scale is not needed. If an operation requires precise positioning at a given point, only one scale mark is needed at each point. In this case the center pole which leads in the direction of movement may be used to anticipate stopping and the trailing center pole used to index. In still other arrangements with the head moving at predetermined constant velocity relative to the scale the scale division may be varied in dimension in correspondence with a given code. Still further the scale need not be grooved, the scale divisions being defined by magnetic zones or, in coarse scale arrangements, the scale divisions may be defined by individual magnets or blocks of magnetic material. Accordingly, it is intended that the foregoing disclosure and the showings made in the drawings are to be considered only as illustrative of the principles of this invention and are not to be construed in a limiting sense.

What is claimed is:

1. An incremental displacement detector comprising, at least one scale of magnetic material having a scale path thereon defined by spaced grooves in one surface thereof with lands therebetween, a pair of electromagnetic members, each electromagnetic member having a core of magnetic material including two legs, one leg terminating in a narrow pole face having a smaller width than the width of said respective grooves and the other pole face having a larger corresponding dimension sufficient to straddle a plurality of adjacent grooves, a coil disposed on said one leg of each core, said cores being disposed with said pole faces positioned for relative movement over said scale path in substantially sliding engagement with said grooved face of said scale and the spacing between said narrow pole faces positioning one narrow pole face substantially centrally of a land when the other narrow pole face is disposed substantially one-quarter of the distance between the centers of adjacent lands for one relative position of said scale with respect to said cores.

2. An incremental displacement detector comprising, at least one scale of magnetic material, having a scale path thereon defined by spaced grooves in one surface thereof with lands therebetween; a pair of electromagnetic members, each electromagnetic member having a core of magnetic material including two legs, one leg terminating in a narrow pole face having a smaller width than the width of said respective grooves and the other pole face having a larger corresponding dimension sufficient to straddle a plurality of adjacent grooves, a coil disposed on said one leg of each core, said cores being disposed in tandem relation along said scale path with said pole faces positioned in substantially sliding engagement with said grooved face of said scale and the spacing between said narrow pole faces positioning one narrow pole face substantially centrally of a land when the other narrow pole face is disposed substantially one-quarter of the distance between the centers of adjacent lands for one relative position of said scale with respect to said cores.

3. An incremental displacement detector comprising: a grooved scale of magnetic material, said grooves defining a scale path having substantially equal scale divisions; a pair of electromagnetic detector heads, each head including a substantially U-shaped core having a pair of core legs terminating in adjacent pole faces, one pole face of each core having a width less than the width of said grooves and the other pole face of each core having a width greater than the dimension across a plurality of adjacent grooves, a coil disposed in each U-shaped core, a support mounting said U-shaped cores in side-by-side relation with said pole faces in substantial sliding engagement with the grooved face of said scale, and means securing said cores in relatively displaced positions in a common geometric surface with the pole faces of one core displaced a pretermined fraction of a scale division relative to the pole faces of the other core.

4. An incremental displacement detector comprising: a grooved scale of magnetic material, said grooves defining a scale path having substantially equal scale divisions; a plurality of electromagnetic detector heads, each having terminals for receiving electrical energy and each having a pole face providing magnetic resolution of said scale; and means mounting said heads and said scale in flux linking relationship for relative movement along said scale path with said heads in fixed relative positions displaced in sequence and in the same sense relative to said grooves.

5. An incremental displacement detector comprising: a scale of magnetic material having spaced grooves in one surface thereof with lands therebetween providing a predetermined unit scale division, a pair of electromagnetic members, each electromagnetic member having a core of magnetic material including two legs, one leg terminating in a narrow pole face having a smaller width than the width of said respective grooves and the other leg terminating in a larger pole face having a larger corresponding dimension sufficient to straddle a plurality of adjacent grooves, a coil disposed on each core, said cores being disposed in substantially side-by-side relationship with said pole faces positioned in substantially sliding engagement with said grooved face of said scale, and means rotatably mounting said cores about a common axis substantially perpendicular to said grooved face to provide a fixed effective relative displacement of said narrow pole faces along said grooves substantially of the order of one-quarter of a scale division.

6. An incremental displacement detector comprising: a grooved scale of magnetic material, said grooves defining a scale path of substantially equal scale divisions and extending laterally of said scale path; a pair of electromagnetic detector heads, each head including a substantially U-shaped core having a pair of core legs terminating in adjacent pole faces, one pole face being narrow and having a width less than the width of said grooves and the other pole face having a width sufficient to straddle a plurality of adjacent grooves, a coil disposed on each U-shaped core; support means mounting said cores in side-by-side relation with all said pole faces terminating in a common geometric surface and with at least said narrow pole faces displaced along said surface less than half the distance between adjacent corresponding points on said scale, said support means positioning said pole faces in substantially sliding engagement with the grooved face of said scale, and means providing relative movement between said detector heads and said scale affording movement of said heads over said grooves.

7. An incremental displacement detector comprising: a grooved scale of magnetic material, said grooves defining a scale path of substantially equal scale divisions and extending substantially laterally of said scale path; a pair of electromagnetic detector heads, each having a core and a coil on each core, each core having a pole face of lesser width than the width of a groove in said scale, means mounting said detector heads in side-by-side relation for movement relative to said scale along said scale with said pole faces confronting the grooved face of said scale, said pole faces being fixedly displaced relative to said grooves along said scale path by an amount less than half the width of a groove.

8. An incremental displacement detector comprising: a scale of magnetic material having spaced grooves defining a scale path, a plurality of electromagnetic devices adapted for electrical energization, each having a pole face of lesser width than the width of a groove in said scale, and means mounting said devices for movement as a unit relative to said scale with said pole faces in displaced positions relative to said grooves along said scale path and adjacent to and in flux linkage with the grooved face of said scale, to provide selective changes in electrical state among said devices between any two corresponding adjacent scale points, in the amount of twice the number of individual electromagnetic devices.

9. An incremental displacement detector comprising: a scale of magnetic material having substantially equally spaced, substantially laterally disposed grooves in one face thereof, at least two electrically energizable electromagnetic devices, each having a pole face of lesser width than the width of a groove in said scale and having a length greater than the width; means mounting said electromagnetic devices with said pole faces in flux linkage with said grooved face of said scale and substantially paralleling said grooves in displaced positions along said scale relative to said grooves providing substantially $180°/N$ phase relation in the electrical states of said electromagnetic devices upon movement of said heads along said scale, where N represents the number of electromagnetic heads; and means providing said relative movement between said scale and said electromagnetic devices.

10. An electromagnetic incremental displacement detector comprising: a scale of magnetic material having scale divisions of differing magnetic characteristic defining a scale path, an electromagnetic detector head assembly comprising a plurality of individual electromagnetic heads having respective pole faces individually providing magnetic resolution of said scale, and means mounting said head assembly and said scale in flux linking relationship for relative movement along said scale path with said heads in fixed relative positions displaced in sequence and in the same sense relative to said scale divisions.

11. An incremental displacement detector comprising: a grooved scale of magnetic material, said grooves defining a scale path; a plurality of electromagnetic detector heads having substantially rectangular pole faces providing magnetic resolution of said grooves, a housing mounting said heads with said pole faces in substantially end-to-end relation, and means mounting said housing and said scale for relative movement along said scale path with said pole faces in flux linking relationship with said grooves and skewed relative to said scale.

12. An incremental displacement detector comprising: a scale of magnetic material having scale divisions of differing magnetic characteristic defining a scale path, a plurality of electromagnetic detector heads having respective substantially rectangular pole faces individually providing magnetic resolution of said scale divisions, a housing mounting said heads with said pole faces in substantially end-to-end relation, and means mounting said housing and said scale for relative movement along said scale path with said pole faces in flux linking relationship with said scale and skewed relative to said scale divisions.

References Cited in the file of this patent

UNITED STATES PATENTS 2,799,835 Tripp ---------------- July 16, 1957

UNITED STATES PATENT OFFICE

CERTIFICATE OF CORRECTION

Patent No. 2,848,698 August 19, 1958

Charles K. Howey et al.

It is hereby certified that error appears in the printed specification of the above numbered patent requiring correction and that the said Letters Patent should read as corrected below.

Column 4, line 3, after "transformer" strike out "5"; line 34, for "increment as" read -- increments --; column 7, line 45, for "180° N" read -- $\frac{180^\circ}{N}$ --; column 11, line 28, for "in each" read -- on each --; column 12, line 75, for "grooves" read -- scale --; same line, for "scale" read -- grooves --.

Signed and sealed this 25th day of November 1958.

(SEAL)
Attest:

KARL H. AXLINE
Attesting Officer

ROBERT C. WATSON
Commissioner of Patents